United States Patent
Bulko et al.

[11] Patent Number: 6,153,164
[45] Date of Patent: Nov. 28, 2000

[54] METHOD FOR PRODUCING URANIUM OXIDE FROM URANIUM TETRAFLUORIDE AND A PHYLLOSILICATE MINERAL

[75] Inventors: John B. Bulko, Franklin; Bridget M. Smyser, Needham, both of Mass.

[73] Assignee: Starmet Corporation, Concord, Mass.

[21] Appl. No.: 09/412,061

[22] Filed: Oct. 4, 1999

[51] Int. Cl.[7] .............................. C01G 43/01; C01B 9/08; C01B 33/10
[52] U.S. Cl. ..................... 423/260; 423/261; 423/341; 423/489; 423/490; 423/491; 423/495
[58] Field of Search ................................. 423/260, 261, 423/489, 490, 491, 495, 341

[56] References Cited

U.S. PATENT DOCUMENTS

| | | |
|---|---|---|
| 3,235,608 | 2/1966 | Gibbs . |
| 4,490,336 | 12/1984 | Worthington et al. . |
| 4,963,294 | 10/1990 | Yato et al. . |
| 5,225,178 | 7/1993 | O'Donnell et al. . |
| 5,320,781 | 6/1994 | Stahlecker et al. . |
| 5,397,375 | 3/1995 | O'Donnell et al. . |
| 5,786,611 | 7/1998 | Quapp et al. . |
| 5,875,385 | 2/1999 | Stephenson et al. . |
| 5,888,468 | 3/1999 | Nachtrab et al. . |
| 5,918,106 | 6/1999 | Bulko et al. . |
| 6,033,642 | 3/2000 | Bulko et al. . |

FOREIGN PATENT DOCUMENTS 2030380  3/1995  Russian Federation .

OTHER PUBLICATIONS

D.T. Meshri, "Fluorine Compounds, Inorganic," Encyclopedia Reprint Series 1995, John Wiley and Sons, Inc., pp. 214–216.

Pong et al., "A Novel Fluoride Process for Producing TiO2 from Titaniferous Ore," Ind. Eng. Chem. Res. 1995, 34, pp. 308–313.

T. Rosenqvist, "Principles of Extractive Metallurgy," 2nd ed. 1983, McGraw–Hill, Inc., pp. 390–391.

S. Harlow, "Final Programmatic Environmental Impact Statement for Alternative Strategies for the Long–Term Management and Use of Depleted Uranium Hexafluoride," Apr. 1999, DOE/EIS 0269.

*Primary Examiner*—Tom Dunn
*Assistant Examiner*—Christina Ildebrando
*Attorney, Agent, or Firm*—Iandiorio & Teska

[57] ABSTRACT

A method for producing uranium oxide includes combining uranium tetrafluoride and a phyllosilicate mineral containing a solid oxidizing agent within the mineral's structure having a lower thermodynamic stability than the uranium oxide; heating the combination below the vapor point of the uranium tetrafluoride to sufficiently react the uranium tetrafluoride and the oxidizing agent to produce uranium oxide and a non-radioactive fluorine compound; and removing the fluorine compound.

18 Claims, 7 Drawing Sheets

FIG. 7

METHOD FOR PRODUCING URANIUM OXIDE FROM URANIUM TETRAFLUORIDE AND A PHYLLOSILICATE MINERAL

FIELD OF INVENTION

This invention relates to a method for producing uranium oxide and more particularly to a method for converting uranium tetrafluoride into uranium oxide and producing a non-radioactive fluorine compound which is free of contaminants.

BACKGROUND OF INVENTION

Uranium is a naturally occurring element which is comprised of approximately 0.7% $^{235}$U and 99.3% $^{238}$U. $^{235}$U is used to produce Nuclear Energy, while $^{238}$U is not. Because of the low percentage of $^{235}$U found in naturally occurring uranium, naturally occurring uranium must be enriched in order to obtain sufficient amounts of $^{235}$U to support nuclear fission. This enrichment process, aside from producing high concentrations of $^{235}$U, produces huge amounts of depleted uranium hexafluoride ($UF_6$) by-product which is a very hazardous compound posing a serious health threat. Since depleted uranium metal is radioactive and expensive to produce, it is used in limited quantities for highly specialized applications. Accordingly, alternative uses are needed in order to avoid having to dispose of the $UF_6$ at great expense by storing it indefinitely. One solution to reducing the large stores of $UF_6$ is to convert the $UF_6$ into uranium oxide, e.g. $UO_2$, $UO_3$, or $U_3O_8$.

One use for uranium oxide is to add it to the concrete which is used to build bunkers in which radioactive waste is stored in order to provide high density shielding for the stored high level radioactive waste. Uranium oxide possesses outstanding radioactive shielding properties and when added to concrete in the form of aggregate makes a very effective, low cost shielding material.

There are many methods which can be used to convert $UF_6$ into uranium oxide. Many of these methods also produce potentially valuable by-products. However, methods which are currently used to convert the $UF_6$, into uranium oxide taint these valuable by-products with radioactive uranium, rendering the by-products commercially unusable, requiring additional processing to remove the radioactivity, as well as additional contaminants, or disposing of the by-products as low level radioactive waste.

The most common method for producing uranium oxide includes reacting uranium hexafluoride with steam ($H_2O$) and hydrogen ($H_2$). This produces uranium oxide and hydrogen fluoride gas (HF). However, because the products and reactants are mixed in the as phase, this HF gas, although having economic value, is contaminated by unreacted uranium thus reducing its value as discussed above. Moreover, it is highly diluted with water, due to the steam, further reducing its value.

Another method for producing uranium oxide reacts $UF_6$ with $H_2$ to produce uranium tetrafluoride ($UF_4$) and HF gas. The $UF_4$ is then reacted with steam to produce a uranium oxide, $UO_2$ or $U_3O_8$, and HF gas. However, the reverse reaction is so strong that tremendous amounts of steam must be used to avoid a reverse reaction. This not only requires a large amount of energy to produce the steam, but again produces a highly diluted hydrogen fluoride product that has little commercial value, requiring further processing to obtain a valuable product. Moreover, complete conversion to uranium oxide is nearly impossible thereby degrading the uranium oxide's suitability for making concrete and thus the value of the uranium oxide produced.

Accordingly, the major drawbacks of the presently preferred methods are that the HF is diluted and contaminated with some amount of uranium making it commercially unusable. Thus, while HF has some economic value, the uranium contamination reduces this value and further provides yet another storage dilemma, as encountered with all radioactive waste, or additional processing to purify the HF.

Moreover, these methods are very expensive. Thus, an economical way to convert $UF_6$ to uranium oxide is needed in order to make use of the large quantities of $UF_6$ in storage and produce commercially valuable by-products which are not radioactive and require no additional processing.

SUMMARY OF INVENTION

It is therefore an object of this invention to provide a method for producing uranium oxide from uranium tetrafluoride;

It is a further object of the present invention to provide such a method which produces uranium oxide without radioactive by-products.

It is a further object of the present invention to provide such a method which produces a fluorine compound which is free from radioactive contaminants;

It is a further object of the present invention to provide such a method which produces a fluorine compound which is undiluted with water;

It is a further object of the present invention to provide such a method which completely reacts the uranium tetrafluoride into uranium oxide.

It is a further object of the present invention to provide such a method which is cost effective to implement;

The invention results from the realization that a truly efficient and cost effective method for producing uranium oxide can be achieved by combining uranium tetrafluoride and a naturally occurring phyllosilicate mineral. Phyllosilicate minerals are composed of $SiO_2$ and $Al_2O_3$ substituent groups which can react separately as solid oxidizing agents. The solid oxidizing agents, having a lower thennodynamic stability than any uranium oxide produced, in stoichiometric proportion so that when the combination is heated to a temperature below the vapor or melting point of the uranium tetrafluoride or the solid oxide the uranium tetrafluoride completely reacts with the oxidizing agent to produce uranium oxide and a volatile fluorine compound free from radioactive carryover and other contaminants. The cost effectiveness of this approach results from the realization that phyllosilicate minerals such as kaolin, bentonite, and talc are readily available, inexpensive, and naturally occurring.

This invention features a method for producing uranium oxide including combining uranium tetrafluoride and a phyllosilicate mineral containing a solid oxidizing agent having a lower thermodynamic stability than the uranium oxide to be produced, heating the combination below the vapor point of the uranium tetrafluoride to sufficiently react the uranium tetrafluoride and the oxidizing agent to produce uranium oxide and non-radioactive fluorine compound, and removing the fluorine compound.

In a preferred embodiment, the uranium tetrafluoride and the phyllosilicate mineral are combined in stoichiometric proportion with respect to the oxidizing agent contained within the mineral. The oxidizing agent may include a solid metal oxide that reacts with uranium tetrafluoride to produce a volatile fluorine compound. The oxidizing agent may include a solid metal oxide that reacts with the uranium tetrafluoride to produce a gaseous fluorine compound. The method may further include introducing oxygen to the reaction. Heating may include heating the combination in a temperature range of 400° C. to 1000° C. The phyllosilicate mineral may be selected from the group of minerals of kaolin, talc, bentonite, and pyrophyllite. The oxidizing agents contained within these minerals may include $SiO_2$, $Al_2O_3$, or MgO. The uranium oxide produced may include $U_3O_8$. The fluorine compound produced may include $SiF_4$, $AlF_3$, and $MgF_2$. The uranium oxide produced may include $UO_2$. The uranium oxide produced may include $UO_3$. The uranium tetrafluoride may be powdered and the oxidizing agent may be granular or powdered. Heating may include heating the combination below the melting point of the oxidizing agent. Heating may include heating the combination below the melting point of the uranium tetrafluoride.

The invention also features uranium oxide produced by the combining uranium tetrafluoride and a phyllosilicate mineral containing a solid oxidizing agent having lower thermodynamic stability than the uranium oxide to be produced, heating the combination below the vapor point of the uranium tetrafluoride to sufficiently react the uranium tetrafluoride and the oxidizing agent to produce the uranium oxide and a non-radioactive fluorine compound, and removing the fluorine compound.

In a preferred embodiment the uranium oxide may be $UO_2$. The uranium oxide may be $U_3O_8$. The uranium oxide may be $UO_3$.

DISCLOSURE OF PREFERRED EMBODIMENT

Other objects, features and advantages will occur to those skilled in the art from the following description of a preferred embodiment and the accompanying drawings, in which:

Figure 1:
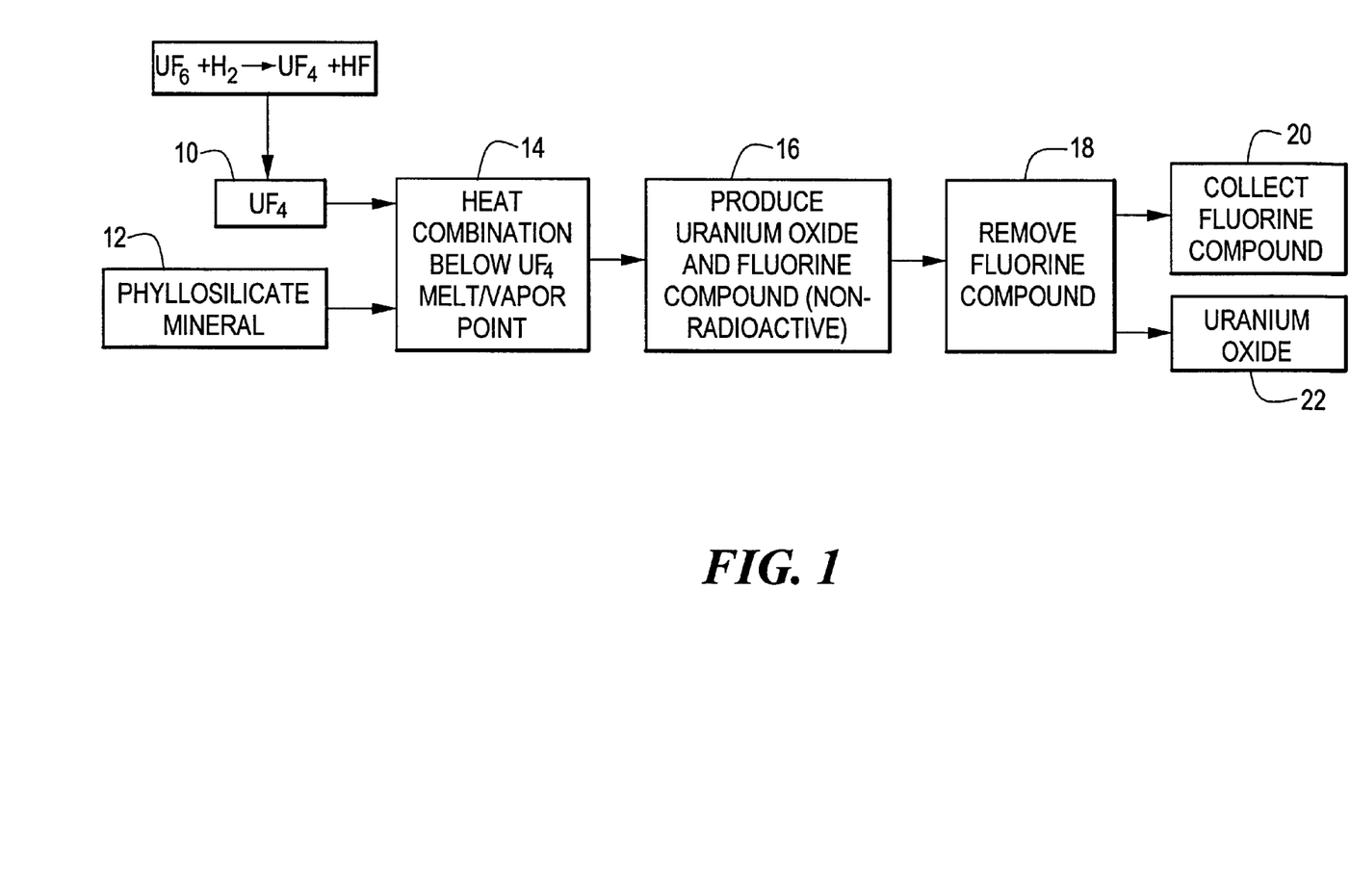
FIG. 1 is a block diagram of the method for producing uranium oxide according to the present invention.

Uranium hexafluoride $UF_6$ is reacted with hydrogen $H_2$ to produce uranium tetrafluoride ($UF_4$) 10, FIG. 1. The $UF_4$ 10 is combined with a phyllosilicate mineral containing a solid oxidizing agent 12, and the combination is heated 14 below the vapor or melting point of $UF_4$ 10 to produce uranium oxide and a fluorine compound 16 without uranium carry-over. The non-radioactive fluorine compound is then removed 18, for example by gas separation, leaving reacted uranium oxide 22, and collected 20.

Figure 2:
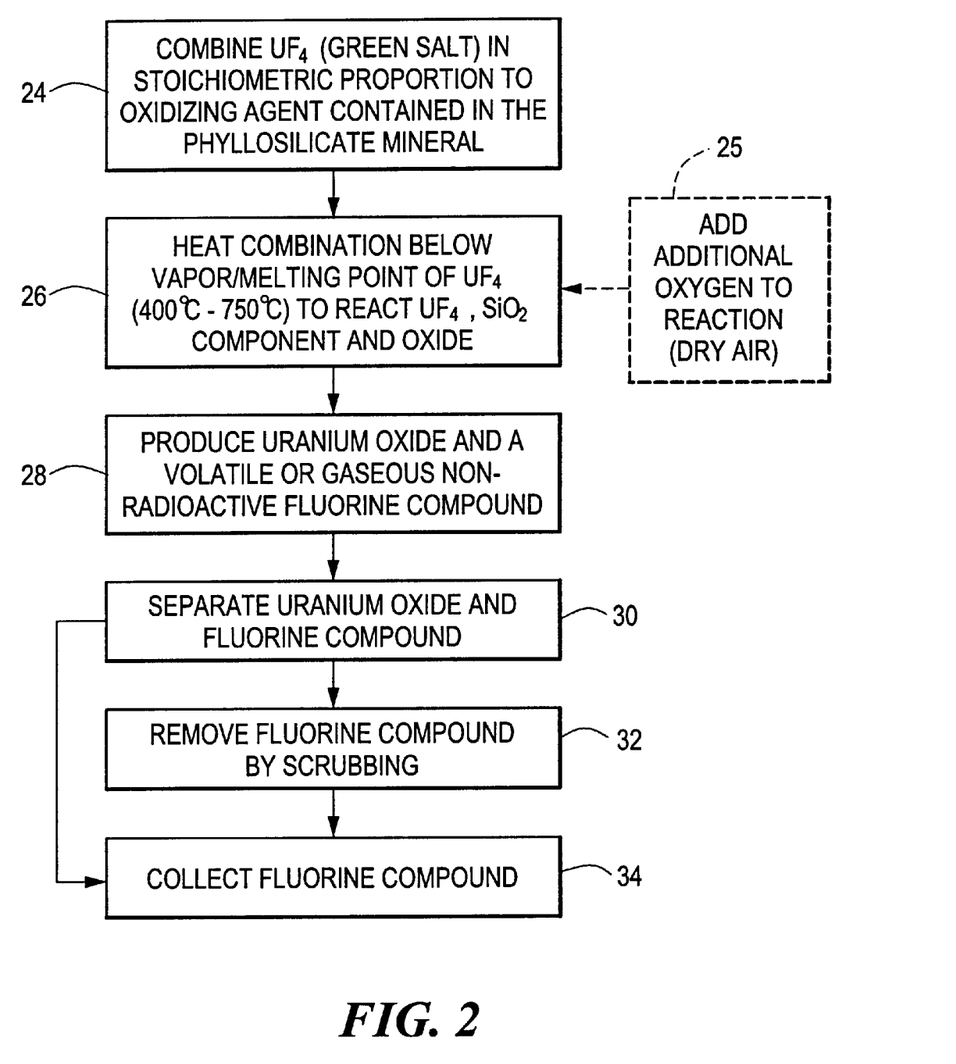
FIG. 2 is a flow chart of the method for producing uranium oxide according to the present invention.

The $UF_4$, or green salt, which may be granular, is combined in stoichiometric proportion to the oxidizing agent, block 24, FIG. 2. This ensures that the $UF_4$ is completely reacted. The mineral containing the oxidizing agent may be mixed, however, in slight excess of its stoichiometric proportion. The oxidizing agent is chosen such that it has a lower thermodynamic stability than any oxide of uranium, $UO_2$, $U_3O_8$, or $UO_3$, which may be produced. This is done so that when the combination is heated to sufficiently react the oxidizing agent with the uranium tetrafluoride, block 26, the solid oxide components of the mineral readily give up their oxygen and an oxide of uranium and a volatile, or gaseous, fluorine compound are produced, block 28. In some instances oxygen may be added, block 25 shown in phantom, in the form of dry air for example, in order to obtain a desired oxide of uranium.

However, the combination is heated, block 26, only to a temperature below the melting point of the uranium tetrafluoride and oxidizing agent, typically within a temperature range of 400° C. to 1000° C. Heating the combination below the vapor point or melting point of either component prevents vaporization of the uranium, ensuring that the uranium does not enter the gaseous phase and thus contaminate the fluorine product with radioactive uranium, and that the fluorine compound produced is not contaminated by any other compound, but remains essentially pure.

Moreover, heating the stoichiometric combination below either the vapor or melting point of $UF_4$ further ensures that the $UF_4$ completely reacts with the oxidizing agent, because no unreacted uranium is lost to the fluorine compound. Producing a volatile or gaseous fluorine compound allows the uranium oxide and fluorine compound to be easily separated so that the non-radioactive fluorine compound may be removed, block 30.

Once the fluorine compound has been removed, block 32, for example by scrubbing the fluorine compound using an adsorbent bed or trapping the fluorine compound with a reactive agent to separate out the fluorine compound, the fluorine compound can be collected, block 34. This is not a necessary limitation of the invention, however, as the fluorine compound may be directly collected. The fluorine compound is recovered from the bed material or trap residue through thermal decomposition, well known in the art.

Thus, by heating the $UF_4$ below its vapor or melting point ensures not only that the fluorine compound is not contaminated by unreacted uranium, but that all the uranium tetrafluoride is reacted due to the stoichiometric proportions in which the combination was mixed and the elimination of uranium carryover, producing a valuable oxide of uranium.

Choosing an oxidizing agent having a lower thermodynamic stability than any oxide of uranium which may be produced, as determined by the enthalpy of formation, further ensures the uranium tetrafluoride is completely reacted.

For example, $U_3O_8$ has an enthalpy of formation of −854.1 kcal/mole, as shown in Table 1.

TABLE 1

| OXIDE | ENTHALPY OF FORMATION ($-\Delta H_f°298$) kcal/mole |
|---|---|
| $U_3O_8$ | 854.1 |
| $UO_2$ | 259.0 |
| $UO_3$ | 292.3 |
| $SiO_2$ | 217.0 |
| $Al_2O_3$ | 400.4 |
| MgO | 143.7 |

When the oxidizing agent is a metal oxide such as $SiO_2$, having an enthalpy of formation of −217.0 kcal/mole, the $SiO_2$ readily gives up its oxygen which is readily accepted by the uranium to produce, $UO_2$, $UO_3$, and $U_3O_8$ and $SiF_4$ according to the reactions:

$$3SiO_2 + 3UF_4 + O_2(g) = U_3O_8 + 3SiF_4(g) \quad (1)$$

$$2SiO_2 + 2UF_4 + O_2(g) = 2UO_3 + 2SiF_4(g) \quad (2)$$

$$SiO_2 + UF_4 = UO_2 + SiF_4(g) \quad (3)$$

The phyllosilicate minerals that may be used and the oxidizing agents contained within these minerals are shown in Table 2.

TABLE 2

| Mineral Name | Formula | Fluorine compounds | Weight Fraction $SiO_2$ |
|---|---|---|---|
| Talc | $3MgO*4SiO_2*H_2O$ | $MgF_2$, $SiF_4$ | 60 |
| Kaolin (kaolinite) | $Al_2O_3*2SiO_2*2H_2O$ | $AlF_3$, $SiF_4$ | 45.8 |
| Bentonite (montmorillonite) | $4Al_2O_3*8MgO*16SiO_2*16H_2O$ | $AlF_3$, $MgF_2$, $SiF_4$ | 61 |
| Pyrophyllite | $Al_2O_3*4SiO_2*H_2O$ | $AlF_3$, $SiF_4$ | 66.7 |

However, this is not a necessary limitation of the invention as these naturally occurring minerals exist in various mixtures that may include small amounts of other ions such as potassium (K), sodium (Na), iron (Fe), calcium (Ca) and titanium (Ti). The minerals may also contain different proportions of the oxidizing agents listed in Table 1.

Examples of the reactions which produce the above compounds include:

$$3UF_4 + 2Al_2O_3 + O_2(g) = U_3O_8 + 4AlF_3 \quad (4)$$

$$3UF_4 + 6MgO + O_2(g) = U_3O_8 + 6MgF_2 \quad (5)$$

$$6UF_4 + 4Al_2O_3 + 3O_2(g) = 6UO_3 + 8AlF_3 \quad (6)$$

$$UF_4 + 2MgO = UO_2 + MgF_2 \quad (7)$$

Depending on the oxide chosen, additional oxygen, $O_2$, may be introduced to the reaction in order to obtain the desired oxide of uranium, $UO_2$, $UO_3$, or $U_3O_8$.

EXAMPLE 1

An amount of 19.7 grams of uranium tetrafluoride was combined with 15.2 grams of kaolin. The combination was vigorously shaken for ten minutes to thoroughly mix the constituents. The combination 36, FIG. 3, was transferred to a high density, non-porous, alumina (99.8%) ceramic crucible 38. The crucible was then placed at the bottom of larger vessel 40, made of Haynes® HR160 alloy and sealed with corrosion resistant cap 42 and teflon gasket seal 44. Cap 42 has inlet ports 46 and outlet port 48 for allowing the gas to flow through vessel 40.

Figure 3:
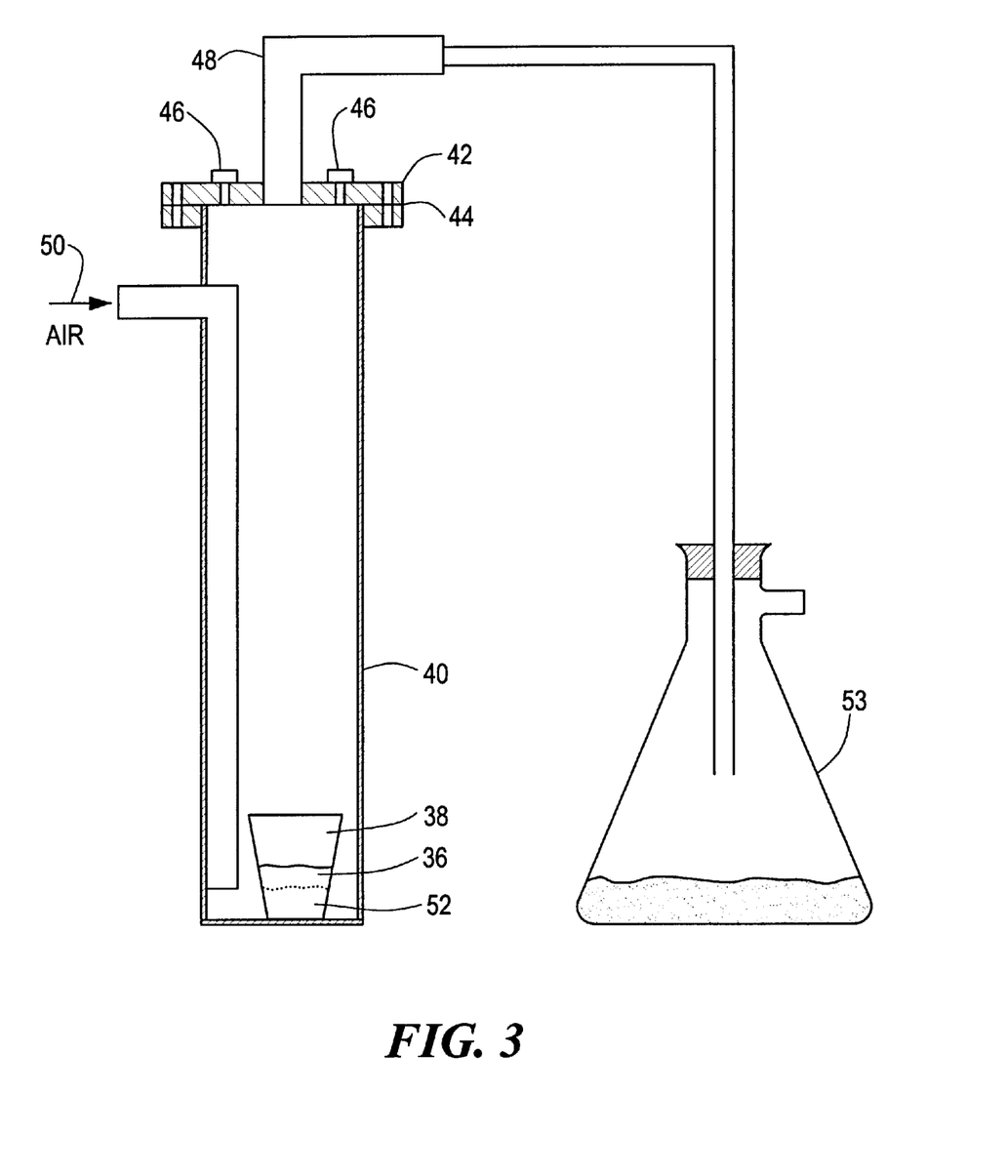
FIG. 3 is a schematic diagram of the apparatus used to produce the uranium oxide and fluorine product according to the present invention.

Sealed vessel 40 was placed in a crucible furnace, not shown. For this particular example, inlet ports 46 were capped and a flow of dry air was established through the vessel through side entry inlet 50 at 150–200 cc/min for the duration of the reaction. A second vessel 53 containing sodium fluoride (NaF) for scrubbing the reaction effluent, was connected to outlet port 48.

Vessel 40 was heated to 700° C. in 10°/min. increments and maintained for three hours thereafter. Vessel 40 was cooled to ambient temperature in 20°/min. increments and crucible 38 removed from vessel 40. Post reaction residue 52, shown in phantom, was gray in color, and flowed easily from crucible 38.

Conversion of $UF_4$ to $U_3O_8$ and $AlF_3$ was essentially complete, nearly 100% yield as determined by x-ray diffraction analysis of the reaction residue.

Verification of complete reaction of the constituents to produce oxides of uranium and aluminum fluoride was achieved using x-ray powder diffraction analysis on post reaction residue 52. X-ray diffraction pattern 54, FIG. 4, of the product residue was compared to a standard x-ray diffraction reference pattern 56, for $U_3O_8$. The correlation of peaks 101–111 of reaction pattern 54 with peaks 101'–111' of $U_3O_8$ reference pattern 56 indicates the presence of $U_3O_8$ in post reaction residue, 52, FIG. 3.

Figure 4:
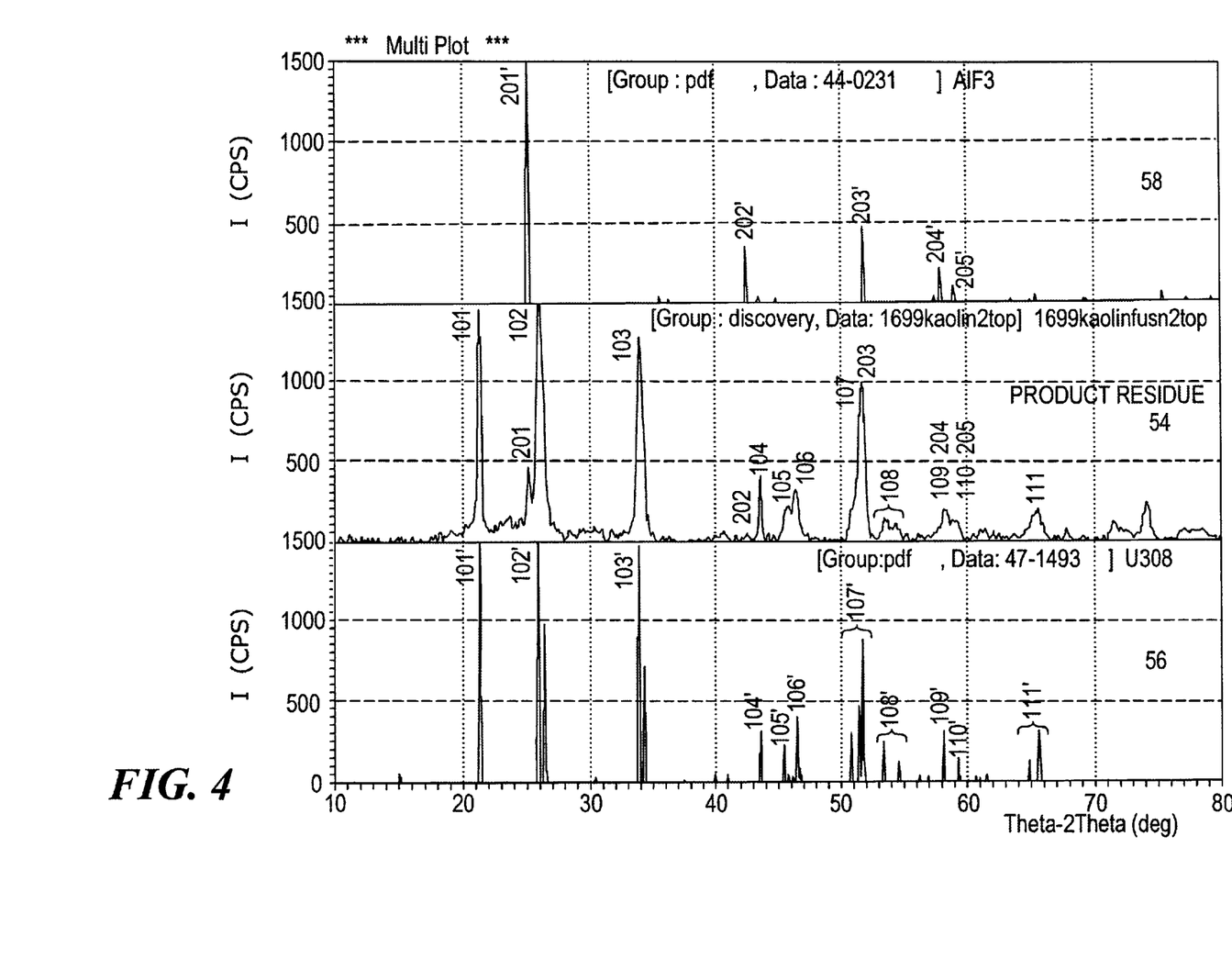
FIG. 4 is a representation of an x-ray diffraction analysis performed on the uranium oxide produced according to the method of the present invention compared to a standard x-ray diffraction pattern for $U_3O_8$.

Similarly, the correlation of peaks 201–205 of reaction residue pattern 54, FIG. 4, with peaks 201'–205' of $AlF_3$ reference pattern 58 indicates the presence of $AlF_3$ in post reaction residue 52, FIG. 3. The absence of non-correlating peaks, in FIG. 4, confirms the absence of unreacted uranium tetrafluoride.

Verification of the fluorine compound may be done in several ways to include collection of the gaseous $SiF_4$ and performing gas analysis, passing the fluorine compound over an adsorbent bed and analyzing the bed material, or chemically reacting the fluorine compound in a trap and analyzing the product using x-ray diffraction as discussed above.

The reaction occurring in the trap in this particular example is given by equations (8):

$$SiF_4(g) + 2NaF = Na_2SiF_6 \quad (8)$$

Verification of $SiF_4$ was done indirectly using x-ray diffraction to analyze the sodium fluoride (NaF) scrubbing media and sodium hexafluorosilicate ($Na_2SiF_6$) produced. X-ray diffraction pattern 60, FIG. 5, of the trap residue was compared to theoretical reference pattern 62 for $Na_2SiF_6$. The correlation of peaks 301–314 of reaction pattern 60 and peaks 301'–314' of theoretical reference pattern 62 indicates the presence of $SiF_4$ in the residue.

Figure 5:
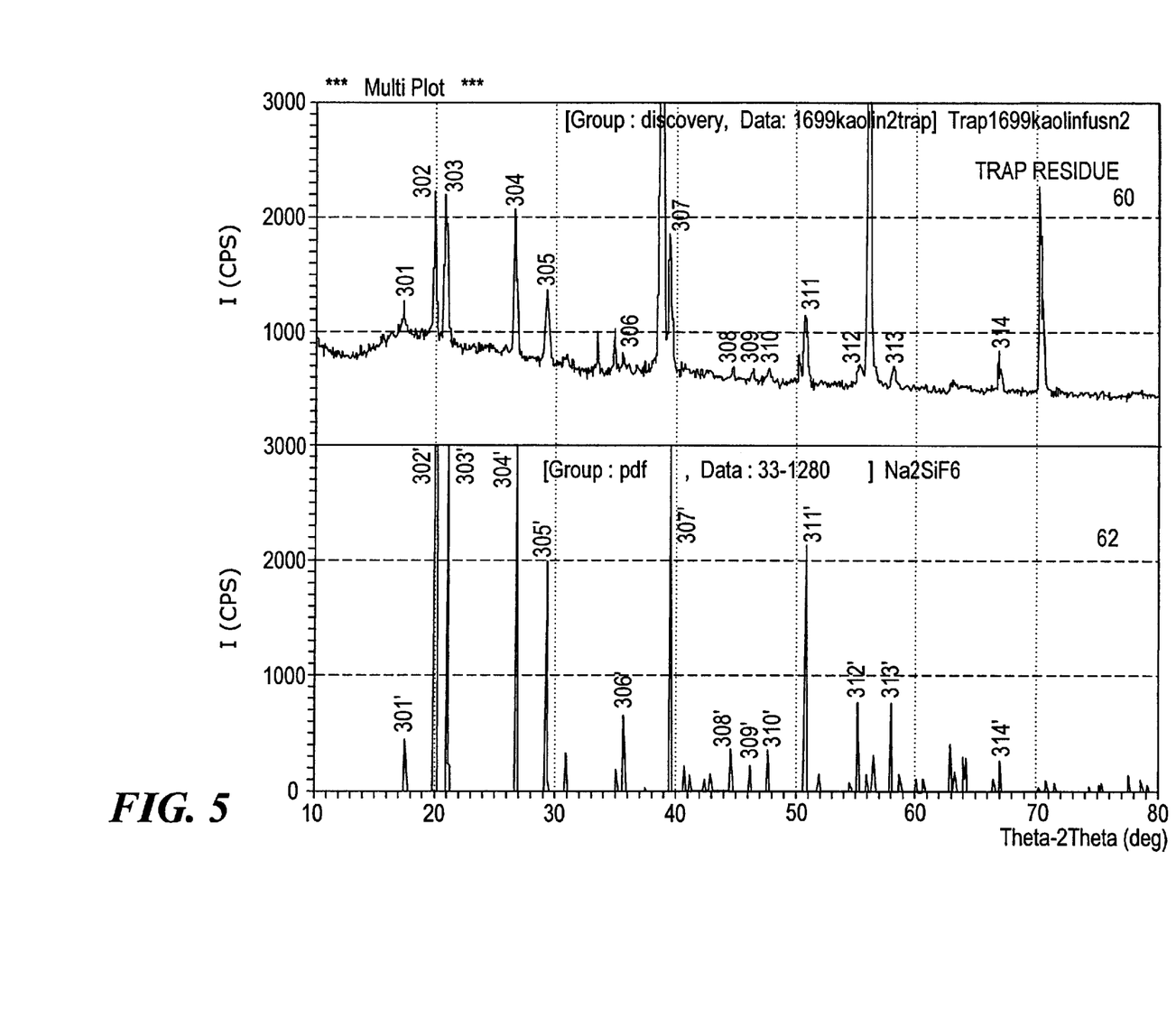
FIGS. 5, 6 and 7 are representations of x-ray diffraction analyses performed on the trap residue, obtained from reacting the fluorine compound produced according to the method of the present invention with a sodium fluoride scrubbing agent.

Thus, verification of $Na_2SiF_6$ indirectly verifies the presence of $SiF_4$ based on the equation (8) set forth the above. Moreover, the absence of non-correlating peaks confirms the absence of unreacted uranium. The $SiF_4$ may be collected through thermal decomposition of $Na_2SiF_6$ by heating the trap residue above 600° C.

EXAMPLE 2

An amount of 31.5 grams of uranium tetrafluoride was combined with 7.0 grams of talc. The combination was vigorously shaken for 10 minutes to thoroughly mix the components. The combination 36 FIG. 3 was transferred to a high density non-porous alumina (99.8%) ceramic crucible 38. The crucible was then placed at the bottom of a larger vessel 40 made of the same material and sealed with corrosion resistant metal cap 42 and ultra high temperature RTV silicon gasket compound. Cap 42 has inlet ports 46 and outlet port 48 for allowing the gas to flow through vessel 40.

Sealed vessel 40 was placed in a crucible furnace, not shown. For this example, a source of dry air was connected to one inlet port 46 with the other inlet remaining capped. A flow of dry air was established through the vessel through port 46 at 150–200 cc/min for the duration of the reaction. A second vessel 53 containing potassium fluoride (KF) for scrubbing the reaction effluent was connected to outlet port 48.

Vessel 40 was heated to 700° C. in 3°/min increments and maintained for three hours thereafter. Vessel 40 was cooled to ambient temperature in 3°/min increments and crucible 38 removed from vessel 40. Post reaction residue 52, shown in phantom, was dark gray in color and flowed easily from crucible 38.

Conversion of $UF_4$ to $U_3O_8$ and $MgF_2$ was essentially complete at nearly 100% yield as determined by x-ray diffraction analysis of the reaction residue.

Verification of complete reaction of the components to produce oxides of uranium and magnesium fluoride ($MgF_2$) was achieved using x-ray powder diffraction analysis on the post reaction residue 52. X-ray diffraction pattern 60 FIG. 6 of the product residue was compared to a standard x-ray diffraction reference pattern 62 for $U_3O_8$. The correlation of peaks 401–417 of product pattern 60 with peaks 401'–417' of $U_3O_8$ reference pattern 62 indicates the presence of $U_3O_8$ in post reaction residue 52 FIG. 3.

Figure 6:
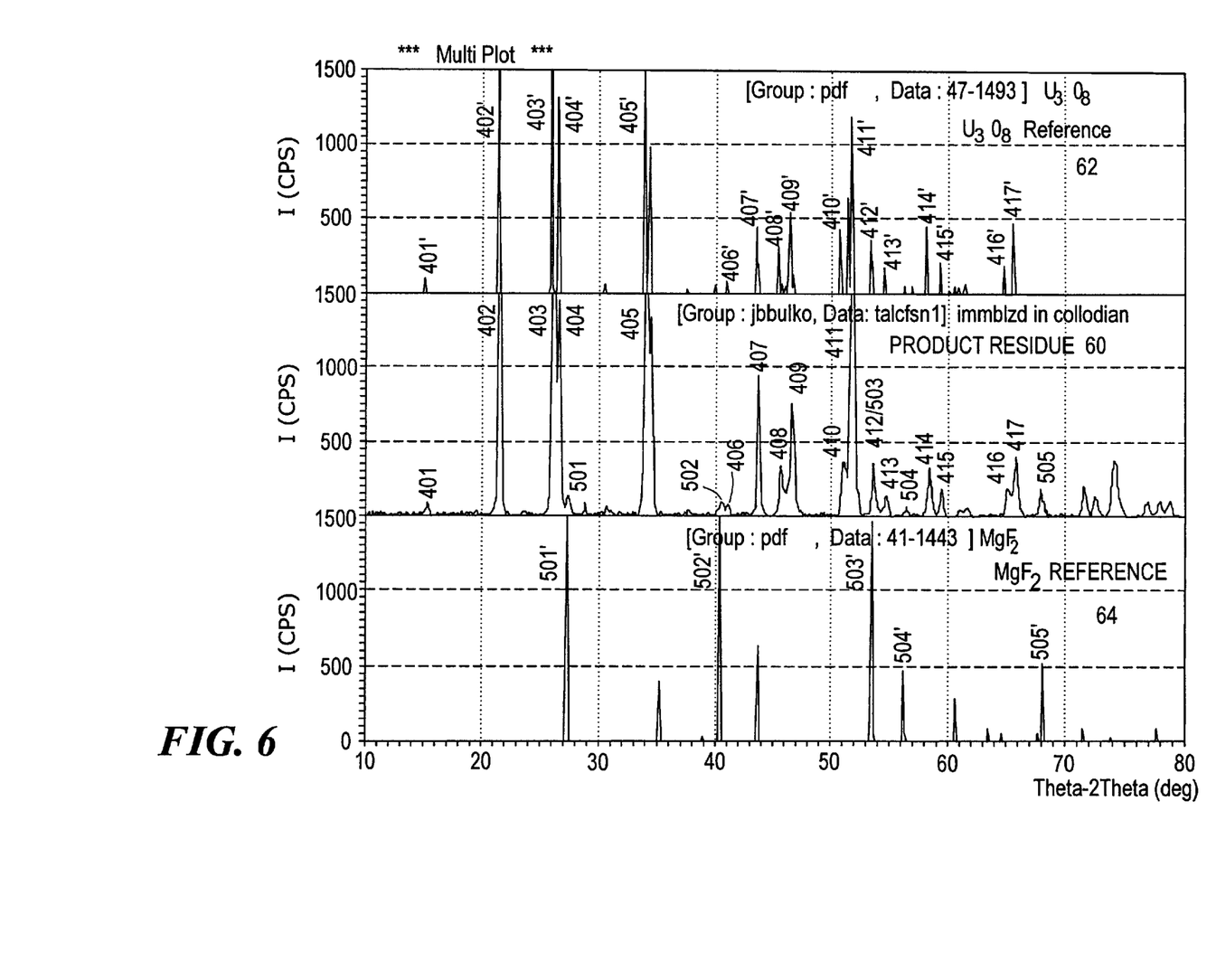

Similarly, the correlation of peaks 501–505 of the reaction residue pattern 60 FIG. 6 with peaks 501'–505' of $MgF_2$ reference pattern 64 indicates the presence of $MgF_2$ in post reaction residue 52 FIG. 3. The absence of non-correlating peaks in FIG. 6 confirms the absence of unreacted uranium tetrafluoride.

Verification of the fluorine compound produced in the reaction may be done in several ways to include collection of the gaseous $SiF_4$ and performing gas analysis, passing the fluorine compound over an adsorbent bed and analyzing the bed material, or chemically reacting the fluorine compound in a trap and analyzing the product using x-ray diffraction as discussed above. The reaction occurring in the trap in this particular example is given by equation (9):

$$SiF_4(g) + 2KF = K_2SiF_6 \qquad (9)$$

Figure 7:
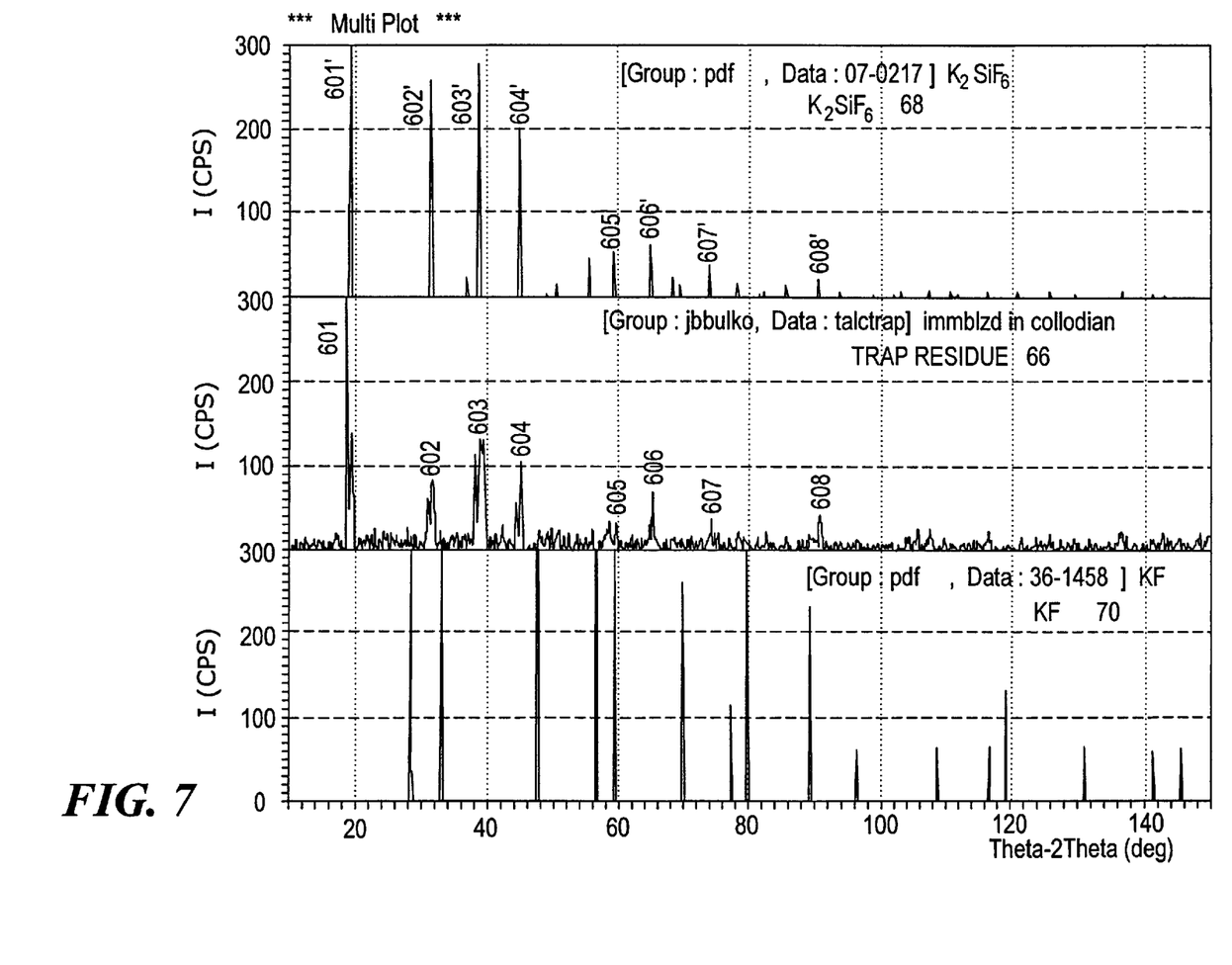

Verification of $SiF_4$ was done indirectly using x-ray diffraction to analyze the potassium fluoride (KF) scrubbing media and $K_2SiF_6$ produced. X-ray diffraction pattern 66 FIG. 7 of the trap residue was compared to theoretical reference pattern 68 for $K_2SiF_6$. The correlation of peaks 601–608 of the trap residue 66 and peaks 601'–608' of the reference pattern 68 indicates the presence of $SiF_4$ in the residue. A reference pattern 70 for KF is also shown in FIG. 7 showing no correlation to the trap residue pattern 66. This verifies the complete conversion of KF to $K_2SiF_6$ as set forth in equation (9) and indirectly verifies the presence of $SiF_4$ in the product stream leaving vessel 40. Moreover the absence of non-correlating peaks confirms the absence of unreacted uranium fluoride. The $SiF_4$ may be collected through thermal decomposition of $K_2SiF_6$ by heating the trap residue above 600° C.

Other embodiments will occur to those skilled in the art and are within the following claims:

What is claimed is:

1. A method for producing uranium oxide comprising:
    combining uranium tetrafluoride and a phyllosilicate mineral containing an oxidizing agent which has a lower thermodynamic stability than the uranium oxide to be produced;
    heating the combination below the vapor point of the uranium tetrafluoride to sufficiently react the uranium tetrafluoride and the oxidizing agent to produce uranium oxide and a non-radioactive fluorine compound; and
    removing the fluorine compound.

2. The method of claim 1 in which combining includes combining the uranium tetrafluoride and the phyllosilicate mineral containing the oxidizing agent in stoichiometric proportion.

3. The method of claim 2 in which the oxidizing agent includes a phyllosilicate mineral containing solid metal oxide subgroups that react with the uranium tetrafluoride to produce a volatile fluorine compound.

4. The method of claim 2 in which the oxidizing agent includes a phyllosilicate mineral containing solid metal oxide subgroups that reacts with uranium tetrafluoride to produce a gaseous fluorine compound.

5. The method of claim 1 in which heating further includes introducing oxygen to the reaction.

6. The method of claim 1 in which heating includes heating the combination in the temperature range of 400° C. to 1000° C.

7. The method of claim 6 in which the phyllosilicate mineral is selected from the group of talc, bentonite, kaolin, and pyrophyllite.

8. The method of claim 7 in which the uranium oxide produced includes $U_3O_8$.

9. The method of claim 8 in which the fluorine compound includes $SiF_4$.

10. The method of claim 8 in which the fluorine compound includes $AlF_3$.

11. The method of claim 8 in which the fluorine compound includes $MgF_2$.

12. The method of claim 7 in which the uranium oxide produced includes $UO_2$.

13. The method of claim 7 in which the uranium oxide produced includes $UO_3$.

14. The method of claim 1 in which the uranium tetrafluoride includes powdered uranium tetrafluoride.

15. The method of claim 14 in which the phyllosilicate mineral is a granular phyllosilicate mineral containing an oxidizing agent consisting of metal oxide subgroups.

16. The method of claim 14 in which the phyllosilicate mineral is a powdered phyllosilicate mineral containing an oxidizing agent consisting of metal oxide subgroups.

17. The method of claim 1 in which heating further includes heating the combination below the melting point of the oxidizing agent.

18. The method of claim 1 in which heating further includes heating the combination below the melting point of the uranium tetrafluoride.

* * * * *